(12) United States Patent
Schaaf et al.

(10) Patent No.: US 9,927,245 B2
(45) Date of Patent: Mar. 27, 2018

(54) MAP SCROLLING METHOD AND APPARATUS FOR NAVIGATION SYSTEM FOR SELECTIVELY DISPLAYING ICONS

(71) Applicant: Alpine Electronics, Inc., Tokyo (JP)

(72) Inventors: David T. Schaaf, Torrance, CA (US); Andrew S. de Silva, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 285 days.

(21) Appl. No.: 14/734,860

(22) Filed: Jun. 9, 2015

(65) Prior Publication Data

US 2015/0292889 A1 Oct. 15, 2015

Related U.S. Application Data

(63) Continuation of application No. 13/897,071, filed on May 17, 2013, now Pat. No. 9,116,004.

(51) Int. Cl.
*G01C 21/26* (2006.01)
*G01C 21/36* (2006.01)
*G06F 3/0484* (2013.01)
*G06F 3/0485* (2013.01)

(52) U.S. Cl.
CPC ........... *G01C 21/26* (2013.01); *G01C 21/367* (2013.01); *G01C 21/3673* (2013.01); *G01C 21/3682* (2013.01); *G06F 3/0485* (2013.01); *G06F 3/04842* (2013.01)

(58) Field of Classification Search
CPC .. G01C 21/367; G01C 21/26; G01C 21/3682; G01C 21/3673
See application file for complete search history.

(56) References Cited

U.S. PATENT DOCUMENTS

| 5,908,465 | A | 6/1999 | Ito et al. |
| 6,542,814 | B2 | 4/2003 | Polidi et al. |
| 2002/0130906 | A1* | 9/2002 | Miyaki ............... G01C 21/3664 715/837 |
| 2006/0174213 | A1* | 8/2006 | Kato ................... G01C 21/367 715/800 |
| 2008/0154488 | A1* | 6/2008 | Silva ..................... G01C 21/36 701/426 |

FOREIGN PATENT DOCUMENTS

| JP | 10-153449 | 6/1998 |
| JP | 11-132777 | 5/1999 |
| JP | 2005-10091 | 1/2005 |

* cited by examiner

*Primary Examiner* — Imran K Mustafa
(74) *Attorney, Agent, or Firm* — Muramatsu & Associates

(57) ABSTRACT

A map scrolling method and apparatus for a navigation system prevents from displaying certain icons while displaying other icons based on conditions and settings of the navigation system during a transition period of a map scrolling operation. The map scrolling method includes the steps of: detecting activation of a map scrolling operation; checking whether there is any limit condition attached to icons as to remove them from a map image; scrolling the map image while removing the icons to which the limit condition is attached from the map image during a transition period of the map scrolling operation; and displaying all of the icons when the map scrolling operation is completed.

8 Claims, 14 Drawing Sheets

Fig. 10

MAP SCROLLING METHOD AND APPARATUS FOR NAVIGATION SYSTEM FOR SELECTIVELY DISPLAYING ICONS

This is a continuation of U.S. patent application Ser. No. 13/897,071 filed May 17, 2013, which is a continuation of U.S. patent application Ser. No. 11/904,905 filed Sep. 28, 2007, the entire contents of which are incorporated herein by reference.

FIELD OF THE INVENTION

This invention relates to a display method and apparatus for a navigation system, and more particularly, to a map scrolling method and apparatus that prevents from displaying certain icons while displaying other icons based on conditions and settings of the navigation system, thereby showing only important information on the screen during a transition period of the map scrolling operation.

BACKGROUND OF THE INVENTION

A navigation system performs travel guidance for enabling a user to easily and quickly reach the selected destination. A typical example is a vehicle navigation system where a vehicle is provided with a navigation function to guide a user to a destination through a calculated route. Such a navigation system detects the position of the user's vehicle, and reads out map data pertaining to an area of the current user position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user. At an intersection, the navigation system notifies the user which direction to turn at the intersection.

Such a navigation system is designed so that the user is able to scroll a map image to see other map image at a desired location and pin-point such a desired location. For example, a user scrolls the map image back and force to find a place such as a favorite restaurant in the city he/she is now visiting. The map scrolling operation may be performed by pointing a cursor on the screen and operating directional keys formed on the panel, remote controller, or touch-screen of the navigation system.

The map image on the navigation screen includes various map elements as well as marks used to identify types and/or names of business, etc. FIG. 1A shows an example of map image where only roads are illustrated whereas FIG. 1B shows an example of map image which includes numerous marks in addition to the roads on a screen 11. Typically, those marks are POI (point of interest) icons which are basically classified into generic POI icons and brand name icons.

In displaying the POI icons, on a map image on the screen, the navigation system may have to sacrifice its performance if the number of such POI icons to be displayed is too numerous. Moreover, too much icons on the map image on the screen can simply confuse the driver by hiding roads, intersections and other information. As shown in FIG. 1B, a map image is covered by a large number of brand name icons 75 and generic POI icons 73.

If a map image of a particular area having many generic POI icons 73 and brand name icons 75 is scrolled in a direction indicated by the cursor 18 as shown in FIG. 2A, too many icons are displayed, moved and overlapped as shown in FIG. 2B. This situation confuses the user because the map elements concerning more important information such as images of roads, directions of roads, and intersections become invisible. In many cases, too many icons on the screen other than the map elements and specific icons are not essential for user.

Further, since too many icons 73 and 75 are on the screen, the performance of the navigation system will be deteriorated, such as decrease of speed in the map scrolling operation, incorrect or incomplete map images, etc. This is because a large portion of the computing power of the navigation system must be used for displaying many icons while changing location of the map image. Accordingly, there is a need of new map scrolling method in which the navigation system selectively displays icons and map elements to assist the user in obtaining relevant information while achieving an optimum performance of the navigation system.

SUMMARY OF THE INVENTION

It is, therefore, an object of the present invention to provide a map scrolling method and apparatus for a navigation system which is capable of selectively displaying icons based on conditions and settings of the navigation system, thereby showing only important information on the screen during the map scrolling operation.

It is another object of the present invention to provide a map scrolling method and apparatus for a navigation system which is capable of selectively displaying icons based on conditions and settings of the navigation system, thereby reducing burdens and improving performance of the navigation system.

It is a further object of the present invention to provide a map scrolling method and apparatus for a navigation system which is capable of selectively displaying icons based on preset conditions or constantly renewed conditions indicated by information from a sensor or a remote service provider.

One aspect of the present invention is a method for scrolling map images for a navigation system. The method includes the steps of: detecting activation of a map scrolling operation of the navigation system; checking whether there is any limit condition attached to icons or map elements as to remove them from the map image; scrolling the map image toward a specified direction while removing the icons or map elements to which the limit condition is attached from the map image during a transition period of the map scrolling operation; and displaying all of the icons and map elements at a location on the map image where the map scrolling operation is completed.

The map scrolling method further includes a step of detecting whether the map scrolling operation is paused by checking a time length of each temporary stop of the map scrolling operation. In this pause process, the method further includes a step of reviving the icons or map elements that have been removed from the map image by representing the icons and map elements with marks of simple and same shape on the map image. Further in this pause process, the method further comprises a step of displaying a list of place names of the icons that are located proximate to a specified location on the map image, either that have been removed or not during the transition period of the map scrolling operation.

In the map scrolling method, the limit condition is attached to generic POI icons where each generic POI icon represents a category of point of interest (POI), and the step of scrolling the map image includes a step of removing the generic POI icons from the map image while continuously displaying brand name icons on the map image during the transition period of the map scrolling operation where each brand name icon represents a particular product, company or a service provider. Alternatively, the step of continuously displaying brand name icons on the map image includes a step of continuously displaying the brand name icons of only within a selected category during the transition period of the map scrolling operation.

In the map scrolling method, the limit condition is attached to generic POI icons where each generic POI icon represents a category of point of interest (POI) and brand name icons where each brand name icon represents a particular product, company or a service provider both of the icons are outside of a selected category, and the step of scrolling the map image includes a step of removing the generic POI icons and the brand name icons to which the limit condition is attached from the map image while continuously displaying the generic POI icons and the brand name icons within the selected category during the transition period of the map scrolling operation.

In the map scrolling method, the limit condition is preset in the navigation system or constantly renewed based on current condition of the navigation system or a vehicle carrying the navigation system. The limit condition is constantly renewed based on a signal from a vehicle sensor that shows current conditions of the vehicle or traffic incident information from a remote server that shows current traffic condition associated with user's travel.

Another aspect of the present invention is a map scrolling apparatus for a navigation system to selectively display icons based on conditions and settings of the navigation system. The map scrolling apparatus includes various means for implementing the operational steps incorporated in the map scrolling method described above. The map scrolling apparatus of the present invention enables to show only important information on the screen during the map scrolling operation. The map scrolling apparatus of the present invention also enables to improve the performance of the navigation system by reducing the burden of displaying all of the icons during the map scrolling operation.

According to the map scroll method and apparatus of the present invention, the navigation system selectively displays icons or other map elements when scrolling the map image. Namely, the navigation system prohibits, during the transition stage of the map scrolling operation, certain icons or map elements from being displayed while allowing the other icons or map elements to be displayed based on predetermined or changing conditions and settings of the navigation system or vehicle. Rather than displaying all of the icons and map elements, since the navigation system displays only the selected icons and map elements, the map image is simplified so that the user will not be distracted by unnecessary information or incorrect information on the map image. Further, the computation power of the navigation system is not impaired because the number of icons on the screen involved in the map scrolling operation is reduced, which improves the performance of the navigation system.

BRIEF DESCRIPTION OF THE DRAWINGS

FIG. 1A shows a map image without generic POI icons and brand name icons and FIG. 1B shows a map image which includes a large number of generic POI icons and brand name icons.

FIG. 2A shows a situation where the navigation system starts scrolling the map image in the direction shown by the cursor and FIG. 2B shows a situation where many icons are overlapped during the transition period of the scroll operation.

FIG. 3A shows a situation immediately before starting the map scroll operation, FIG. 3B shows a situation where generic POI icons are removed from the screen during the transition period of the map scroll operation, FIG. 3C shows a situation where the map scroll operation is paused so that the generic POI icons are recovered in a predetermined form, FIG. 3D shows an example of screen on which the navigation system displays the name and other information on the icons in an area pointed by the cursor shown in FIG. 3C, and FIG. 3E shows a situation where the map scroll operation is completed so that all the generic POI icons are recovered in the original form.

FIG. 10 is a schematic diagram showing an example of data tables or database incorporated in the map scrolling method and apparatus of the present invention, one of which stores the generic POI icons and the other stores the brand name icons.

DETAILED DESCRIPTION OF THE PREFERRED EMBODIMENT

A map scrolling method and apparatus for a navigation system of the present invention will be described in detail with reference to the accompanying drawings. The map scrolling method and apparatus of the present invention is designed to selectively display icons or other map elements when scrolling the map image. Namely, the map scrolling method and apparatus of the present invention prohibits, during the transition stage of the map scrolling operation, certain icons or map elements from being displayed while allowing the other icons or map elements to be displayed based on predetermined or changing conditions and settings of the navigation system or vehicle.

Rather than displaying all of the icons and map elements, the navigation system displays only the selected icons and map elements during the map scrolling operation. Therefore, the map image is simplified so that the user will not be distracted by unnecessary information or incorrect information on the map image. Further, the computation power of the navigation system is not impaired because the number of icons on the screen involved in the map scrolling operation is reduced, which improves the performance of the navigation system. Although the description will be made mainly for a vehicle navigation system, the map scrolling method and apparatus of the present invention is applicable to other apparatuses having a navigation function, such as a portable navigation system, personal computer, cellular phone, etc.

As noted above with reference to FIGS. 1A-1B and 2A-2B, numerous numbers of icons will be displayed on the map image of the navigation screen when, for example, the user is in a downtown area of a city. Such icons can be overcrowded on the map image such that important information such as road and intersection information may be buried or hidden. Especially, when the map image is scrolled, such numerous icons may further complicate the images on the screen and further confuse the user since afterimages of the icons may also be displayed during the transition period of map scrolling operation.

FIGS. 3A-3E are schematic diagrams showing how generic POI icons and brand name icons are displayed during the map scrolling operation of the present invention. Generic POI icons are icons that represent type or category of business, such as restaurants, banks, gas stations, etc. Brand name icons are icons representing particular products, companies or service providers, by such as company logos, marks, etc., which are typically readily recognizable by users by their unique shapes, colors, characters, through long use and promotion of such brand name icons by the companies, etc. A large number of such generic POI icons and brand name icons will be displayed on the map image for a condensed area such as a city downtown, commercial area, complex buildings, etc.

Figure 2A:
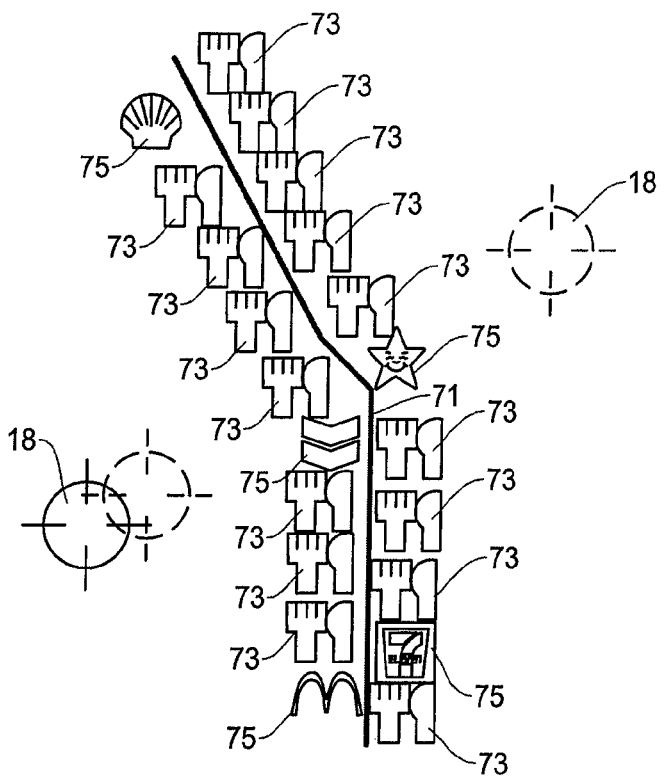
FIGS. 2A and 2B are schematic diagrams showing how the generic POI icons and brand name icons are displayed during a map scrolling operation where
Figure 2B:
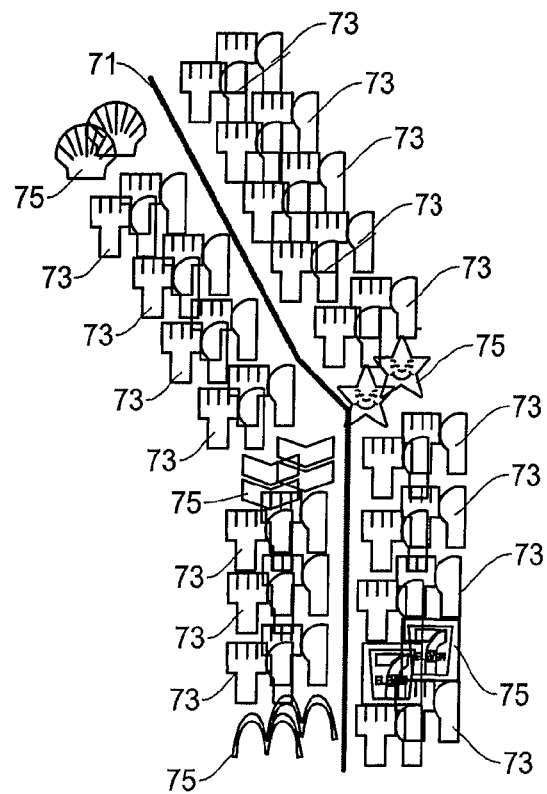
Figure 3A:
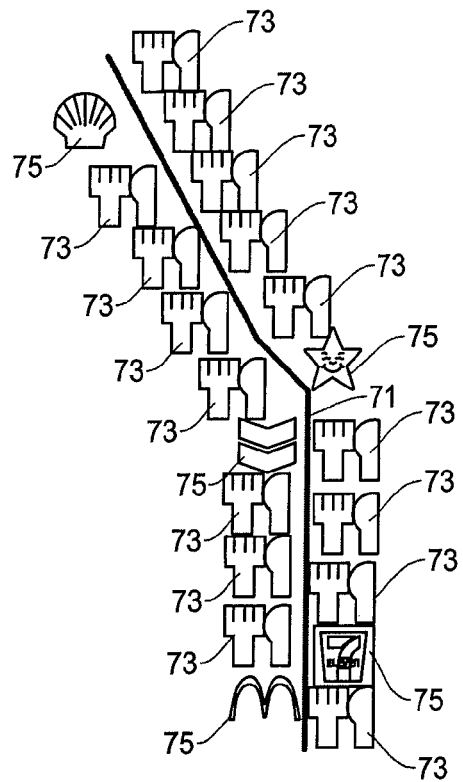
FIGS. 3A-3E are schematic diagrams showing how the generic POI icons and brand name icons are displayed during the map scrolling operation of the present invention where

FIG. 3A shows an example of map image of the navigation system which is in a situation immediately before starting the map scroll operation. Similar to the example of FIGS. 2A and 2B, this example of map image includes generic POI icons 73 and brand name icons 75 that are located along the road 71. In the example of FIG. 3A, the generic POI icons 73 of only the category of restaurants are shown although other categories of POIs, such as lodge, bank and airport can also be displayed. The brand name icons 75 in this example are in the categories of fast food chain store and gas station. Such icons are not limited by the specific examples shown in FIG. 3A.

Figure 3B:
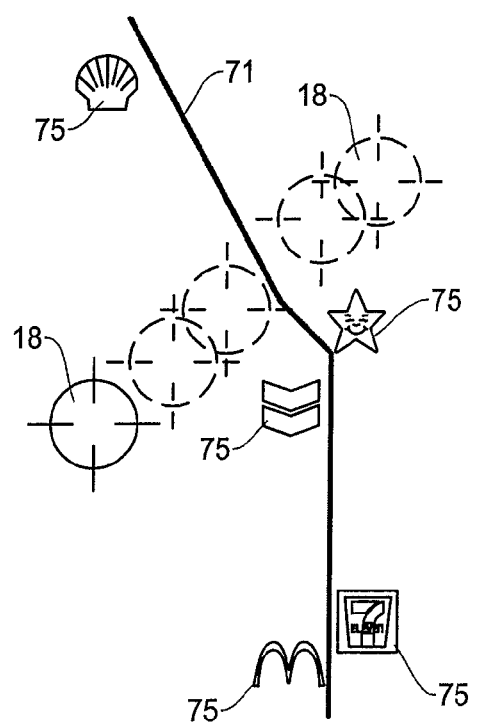

FIG. 3B shows an example of map image during the transition period of the map scroll operation in accordance with the present invention. The scrolling may be performed by a touch pad or physical controllers such as remote controllers or buttons. The map image is scrolled in the direction (upper right or lower left direction) indicated by a plural images of a cursor 18. During this transition stage, the generic POI icons 73 are removed from the map image on the screen.

As shown in FIG. 3B, the map image having the brand name icons 75 is scrolled during which the generic POI icons 73 shown in FIGS. 2A and 3A are not displayed on the map image, thereby simplifying the view on the screen. The map scrolling operation requires much computer power and resources of the navigation system, especially when many video images such as icons are included on the map image. Thus, excluding the generic POI icons during the map scrolling operation from the map image will significantly reduce the burden on the navigation system since the number of POIs that will be indicated by generic icons is very large. As a consequence, not only it is possible to simplify the image on the screen so that the user is able to see the important information but it is also possible to improve the performance of the navigation system.

Figure 3C:
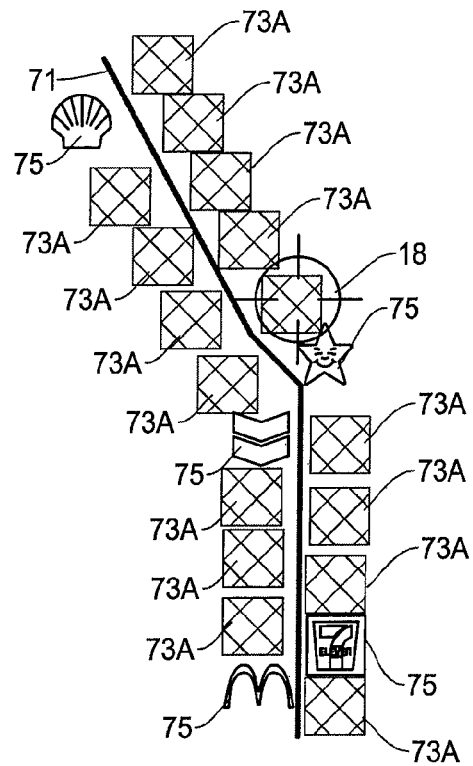

FIG. 3C shows a situation where the map scroll operation is paused so that the generic POI icons are recovered in a specific manner on the map image. Namely, in the present invention, when the map scrolling operation is temporarily stopped for a short period of time, the generic POI icons 73A, which correspond to the generic POI icons 73 in FIGS. 2A and 3A, will be displayed in a simplified manner as shown in FIG. 3C. For example, in this case, all of the generic POI icons 73A will be displayed by the same simple square shape rather than by their original unique shapes of icon indicating the POI category.

Figure 3D:
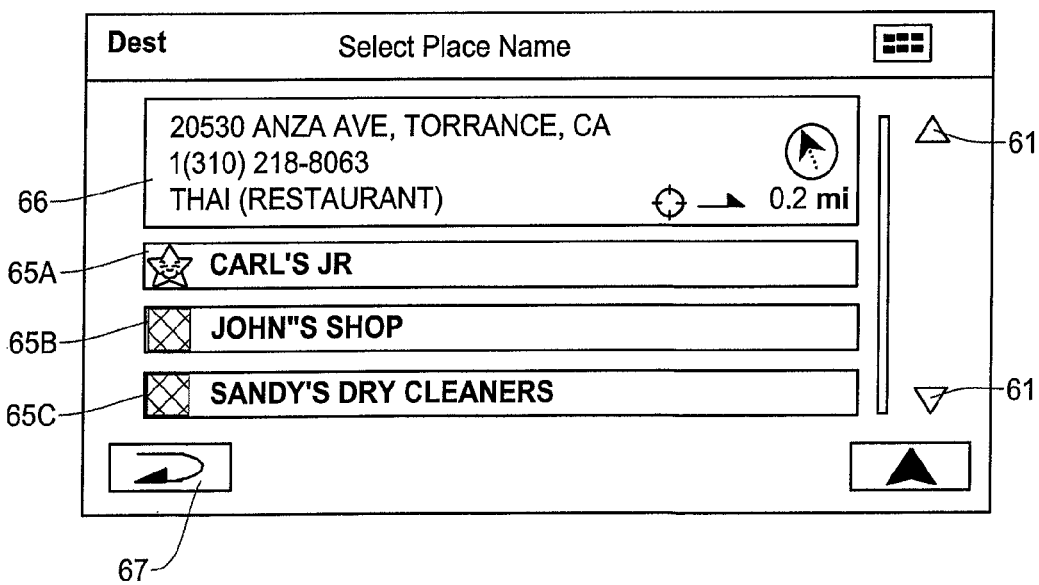
Figure 3E:
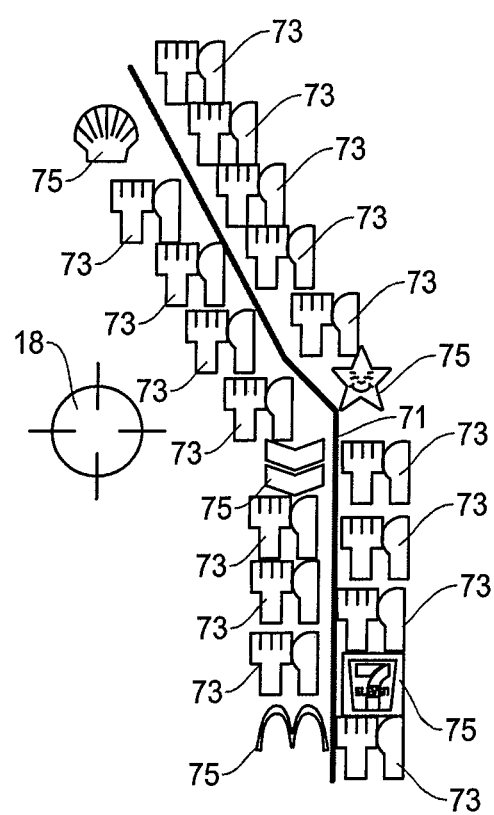

As shown in FIG. 3C, such a same simple shape of the generic POI icons 73A may be a square shape or a circular shape, etc., each being shaded, semi-transparent or transparent on the map image. When the user completely stops the map scrolling operation, the map image will be back to the condition shown in FIG. 3E. Thus, if the user stops the map scrolling operation for a time longer than the predefined time (pause time), the navigation system shows both the brand name icons 75 and the generic POI icons 73, i.e., all the icons and other map elements, on the map image as shown in FIG. 3E which is basically the same as that of FIGS. 2A and 3A.

In the example of FIG. 3C, the cursor 18 points an area that covers the generic POI icons which are now in the same simple shape as well as the brand name icons. When the user clicks the cursor 18 in this situation, the navigation system will display a screen which includes detailed information on the area at the cursor point and a list of POIs, either generic or brand name, as shown in FIG. 3D. In this example, an information window 66 shows the detailed information such as a name, address and telephone number of a POI that is located closest to the point of the cursor 18 of FIG. 3C. The POI list includes the entries 65A, 65B and 65C which show other candidate POIs proximate to the cursor point.

For a POI having a brand name, the brand name icon is displayed next to the POI name such as shown in the POI list entry 65A. If there are many POI names on the POI list, the user may scroll the POI list entries by pressing scroll keys 61. Typically, a back key 67 on the screen enables the user to go back to the previous screen. As noted above, if the user stops the map scrolling operation for a time longer than the predefined pause time, i.e., the map scrolling operation is completed, the generic POI icons 73 will revived at the locations where the map scroll operation ends. Accordingly, all of the brand name icons 75 and the generic POI icons 73 will be displayed on the map image as shown in FIG. 3E.

Figure 1A:
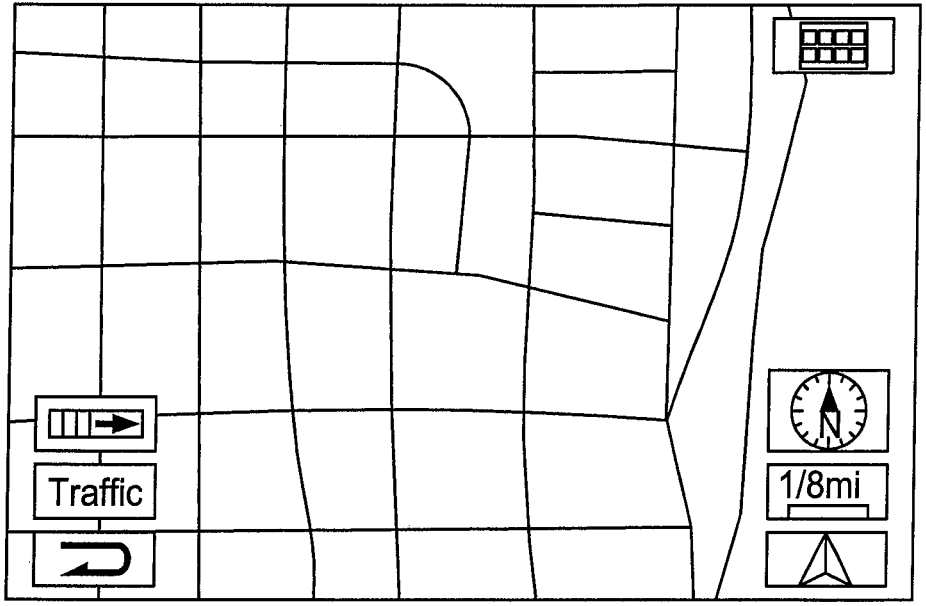
FIGS. 1A and 1B are schematic diagrams showing example of map image on the navigation screen where
Figure 1B:
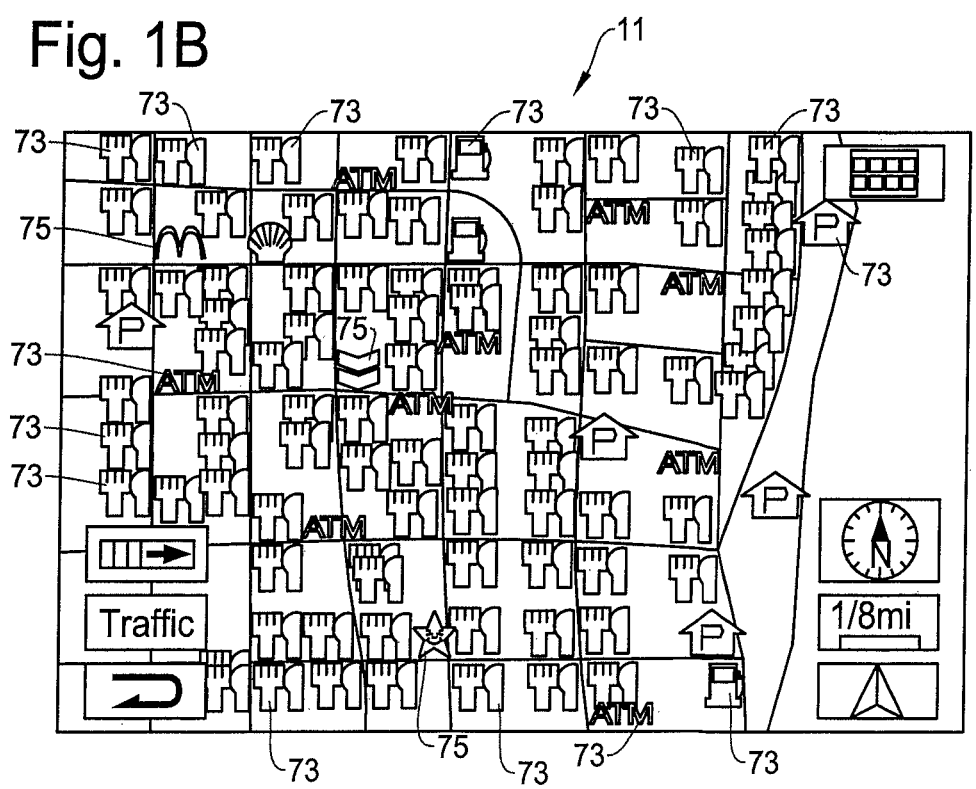
Figure 4:
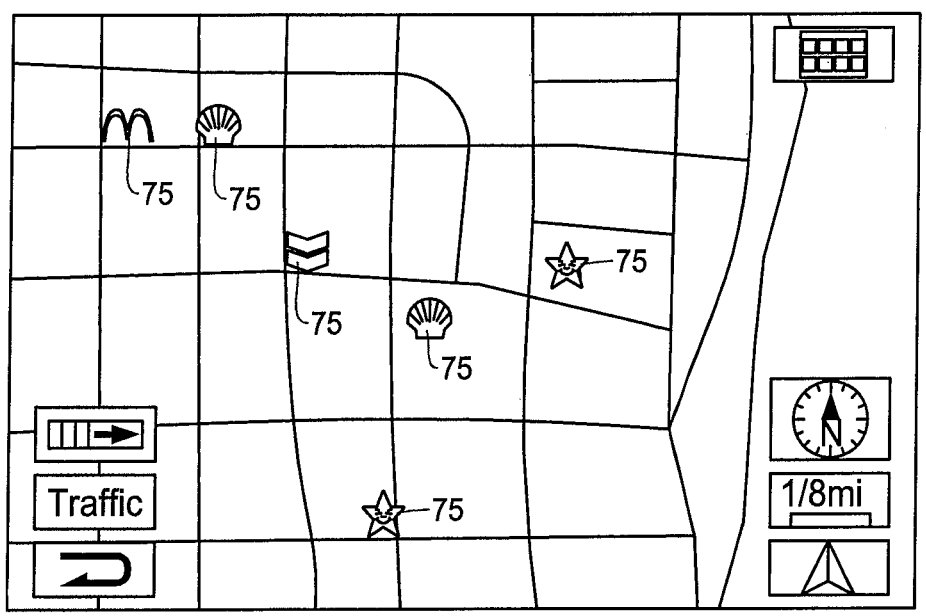
FIG. 4 is a schematic diagram showing an example of screen display of the navigation system under the present invention where the generic POI icons are removed from the map image and the brand name icons are shown during the map scrolling operation.

FIG. 4 shows another example of map image on the screen that corresponds to the screen of FIG. 1B where generic POI icons 73 are erased from the map image during the transition period of the map scrolling. Thus, only the brand name icons 75 are shown on the map image on the screen. Compared to the map image of FIG. 1B, the number of icons in FIG. 4 is significantly reduced, and thus, the important information such as roads and intersections are clearly visible to the user.

Figure 5:
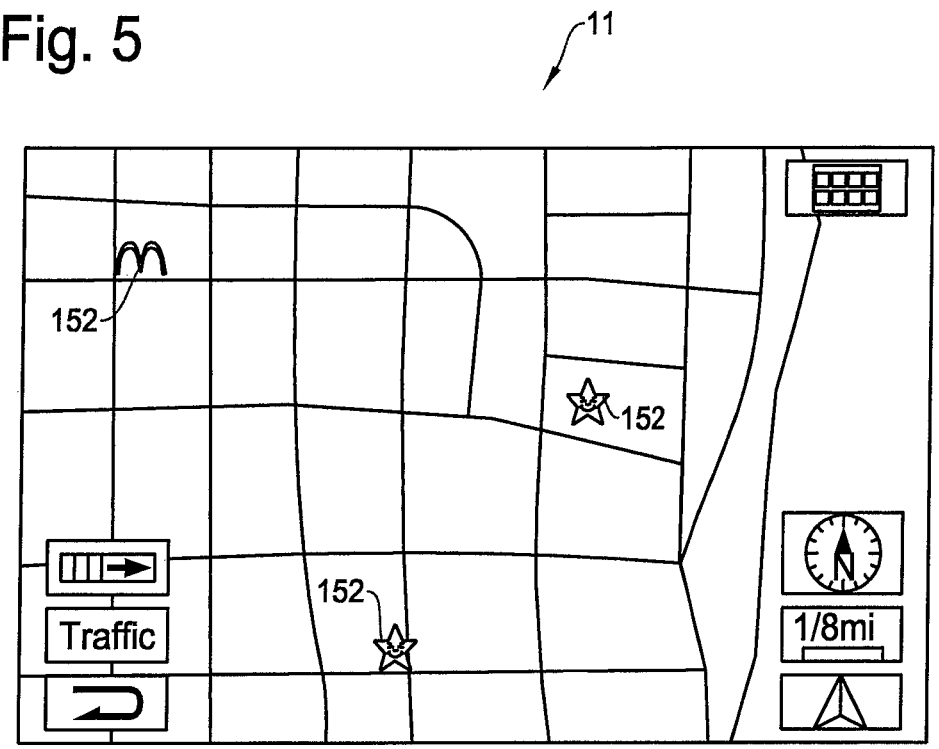
FIG. 5 is a schematic diagram showing an example of screen display of the navigation system under the present invention where only the brand name icons of specified category are shown while the other brand name icons and the generic POI icons are removed from the map image during the map scrolling operation.

FIG. 5 shows another example of map image on the screen that is similar to that of FIG. 4 where generic POI icons 73 are erased from the map image during the transition period of the map scrolling. In the example of FIG. 5, the navigation system displays only selected category of brand name icons, i.e., only restaurant brand name icons 152 and removes the brand name icons of other category. This situation may arise, for example, when the user scrolls the map image after the user has already set the destination which is a restaurant, i.e., the selected category indicated by the brand name icons. Alternatively, such a category of icons can be selected by the user through a system set-up procedure of the navigation system.

Figure 6:
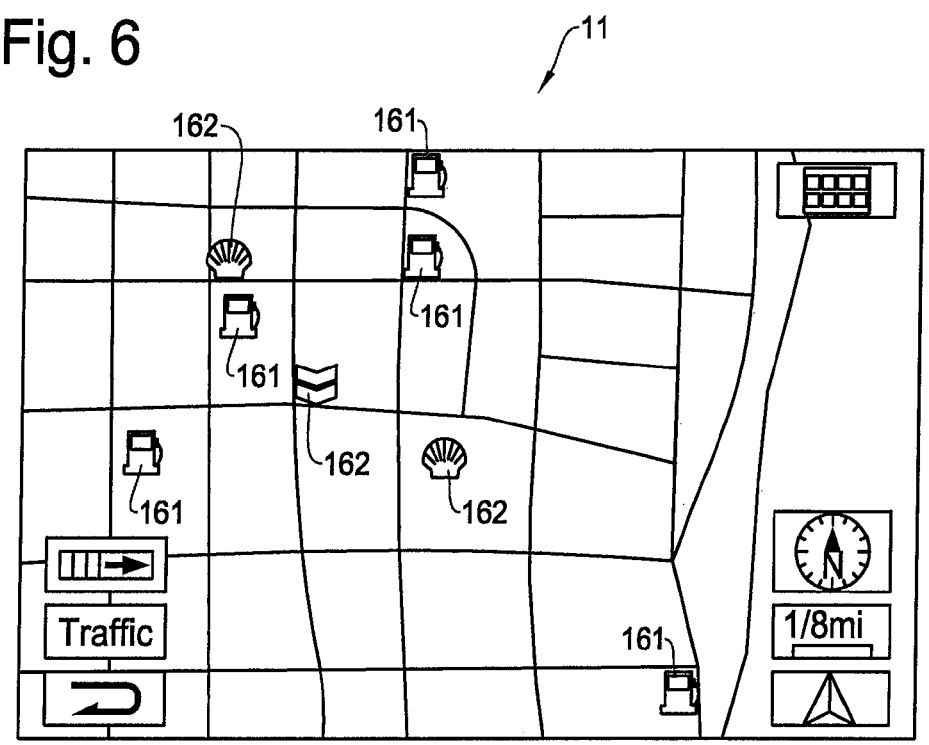
FIG. 6 is a schematic diagram showing an example of screen display of the navigation system under the present invention where only the icons, either generic POI icons or brand name icons, related to gas station are shown on the map image during the map scrolling operation.

FIG. 6 shows a further example of map image on the screen under the present invention where only the icons related to gas station are shown on the screen. Preferably, the navigation system is configured to receive a signal from a vehicle sensor (ex., vehicle sensor 252 in FIG. 12) such that when the gas tank is almost empty, the map view will display generic POI icons and brand name icons of gas stations. Thus, when it becomes necessary to supply the gas in the vehicle, the navigation system reminds the user to go to a nearby gas station by displaying any gas station icons 161 and 162, both generic and brand name, during the map scrolling operation. In such a situation, for example, even if the navigation system has been set to display only selected icons, such as restaurant POI icons, it will override the setting when the gas is almost empty. Although only gas station POI icons are displayed in the example shown in FIG. 6, the navigation system may display the gas station icons in addition to other icons.

Figure 7:
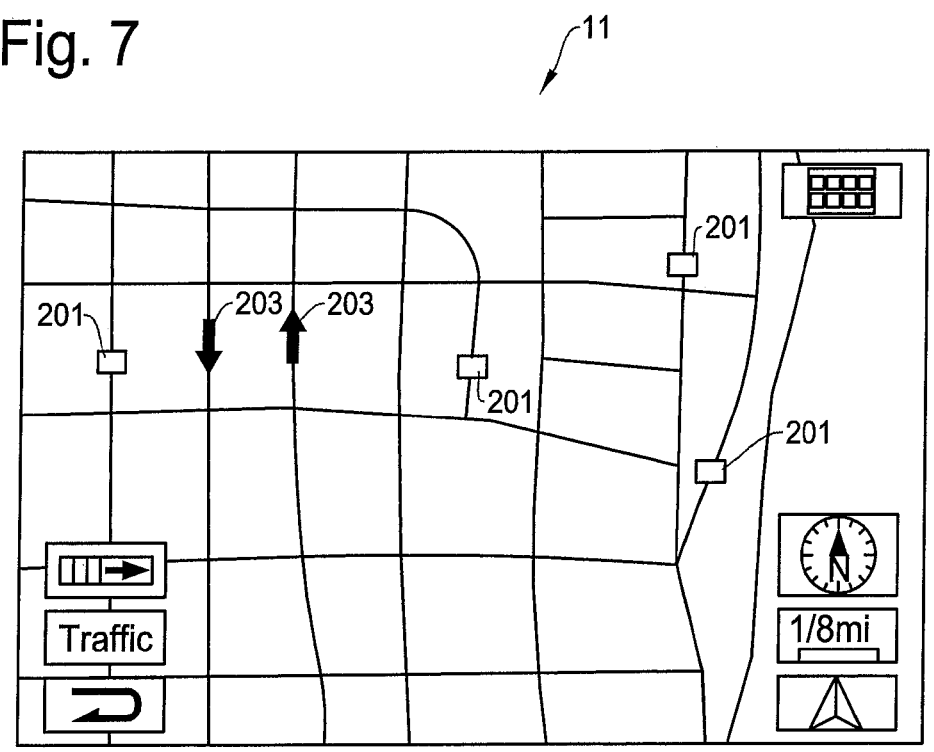
FIG. 7 is a schematic diagram showing an example of screen display of the navigation system under the present invention where only the traffic information icon are shown and all the other icons are removed from the map image during the map scrolling operation.

FIG. 7 shows a further example of map image on the screen under the present invention where traffic related icons are the only icons displayed on the map image during the map scrolling operation. In this example, traffic incident icons 201 and traffic direction (one-way) icons 203 are shown on the map image. Similar to the gas station icons described above with reference to FIG. 6, the navigation system is preferably configured to receive traffic incident information, such as traffic accident, congestion, construction, lane closure, etc., from a service provider through a wireless transceiver (ex., wireless transceiver 249 in FIG. 12).

Thus, the traffic incident icons 201 indicating the current traffic situation will be displayed on the screen based on the traffic information from the service provider. Since the traffic information shows current traffic condition associated with user's travel, the traffic incident icons 201 will be displayed with higher priority than other icons during the map scrolling operation. The traffic direction icons 203 will be created based on the map data retrieved from the map data storage (ex., map data storage 231 in FIG. 12) where attribute data on each road includes information regarding a type of road such as a one-way road. For example, the navigation system may be set to automatically display traffic related icons during commuting hours. Since such traffic icons are more important than other icons such as POI icons, the navigation system continues to display the traffic icons during the transition period of the map scrolling operation.

Depending on the situation, the navigation system may erase some icons while display other icons. Namely, the condition as to whether to erase particular icons or not is constantly renewed based on current condition of the navigation system or the vehicle carrying the navigation system. The user may select certain brand name icons so that only the selected or favorite brand name icons will be displayed. In still another embodiment, the navigation system may be set to display certain icons for a particular area. For instance, the navigation system may be set to display only brand name icons in the category of hotel when the user is in an area of airport. The user may customize the area and the brand name icons that are displayed for the selected area.

As a further example, the navigation system may be set to display icons and map element of higher priority based on the speed of the vehicle. For example, the navigation system may display only the brand name icons during the map scrolling operation when the vehicle speed is 45 miles or higher. The navigation system may also determine the usage of the computer power and prevent the operation from displaying certain icons to save computational resources, thereby improving performance such as operation speed.

The basic operational steps of scrolling the map image under the present invention is described with reference to the flow chart of FIG. 8. The map scrolling method and apparatus of the present invention is designed to selectively display icons or other map elements when scrolling the map image. During the transition stage of the map scrolling operation, certain icons and/or map elements are prohibited from being displayed while other icons and/or map elements are allowed to be displayed based on predetermined conditions and settings of the navigation system or the detected conditions of the vehicle.

First, the navigation system will display the map image in the step 101 where such a map image can be that of FIG. 1B showing numerous icons and map elements. As noted above, the icons include generic POI icons, brand name icons, traffic incident icons, etc. The map elements include roads with different classes, intersections, two dimensional shapes showing mountains, rivers, ponds, buildings, and bridges, etc.

The navigation system checks whether the map scrolling operation is started in the step 102 by monitoring whether the map scroll keys are activated. The navigation system repeats the steps 101 and 102 until the map scrolling operation is conducted by the user. If the map scrolling operation is activated, the navigation system determines whether there are any conditions or settings, such as erasing certain icons, involved in the map scrolling operation in the step 103.

If there is no condition attached to the map scrolling operation, the process moves to the step 104 in which the navigation system scrolls the map image with all of the icons and map elements. Thus, none of the icons and the map elements are removed or erased from the map image during the transition period of the map scrolling operation. In the step 105, the navigation system displays the map image at the final location specified by the user with all of the icons and map elements.

If the navigation system detects that there are limit conditions attached to the map scrolling operation in the step 103, the process moves to the step 106 in which the navigation system checks and retrieves the conditions and settings involved in the map scrolling operation. Typically, such a condition is to erase the specified type of icons during the transition period of the map scrolling operation as described with reference to FIGS. 3A-3E. The examples of other conditions and settings have been described above with reference to FIGS. 4-7. For example, with respect to the gas station icons in FIG. 6, such a condition is the signal from the vehicle sensor indicating that the gas tank is almost empty.

Based on such conditions and settings, in the step 107, the navigation system scrolls the map image toward the specified direction by displaying the selected icons and map elements. In other words, the navigation system removes specified icons and map elements from the map image during the transition stage of the map scrolling operation. The removal of the specified icons and map elements during the map scrolling operation from the map image significantly simplifies the image on the screen so that the user is able to see the important information. The simplified map image on the screen also contributes to improve the performance of the navigation system.

In the step 108, the navigation system determines whether the map scrolling operation is paused, i.e., temporarily stopped for a short period of time. This can be done by checking a time length of each stop of the map scrolling operation, for example, to see whether it is longer than a predefined time length. If there is no pause, the navigation system repeats the steps 107 and 108 noted above. If the map scrolling operation is paused, the process moves to the step 109 in which the navigation system revives the specified icons and map elements that have been removed from the map image.

As described with reference to FIG. 3C, such revived icons do not have the original image but rather have marks each being a simple and identical shape, which simplifies the operation of the navigation system. In this situation, if the cursor 18 points an area that covers the revived icons which are now in the same simple shape or other icons and the user clicks the cursor, the navigation system will display more detailed information on the icons in the area. An example of such a screen which includes detailed information of the place at the cursor point and a list of names of POIs is shown in FIG. 3D as described above.

In the step 110, the navigation system determines whether the map scrolling operation by the user is completed, i.e., stopped for a time longer than a predetermined time. If the map scrolling operation is not completed, the navigation system repeats the steps 107-110 noted above. If it is determined that the map scrolling operation is completed, the process moves to the step 111 in which the navigation system displays the map image at the final location specified by the user with all of the icons and map elements as shown in FIG. 3E.

Figure 8:
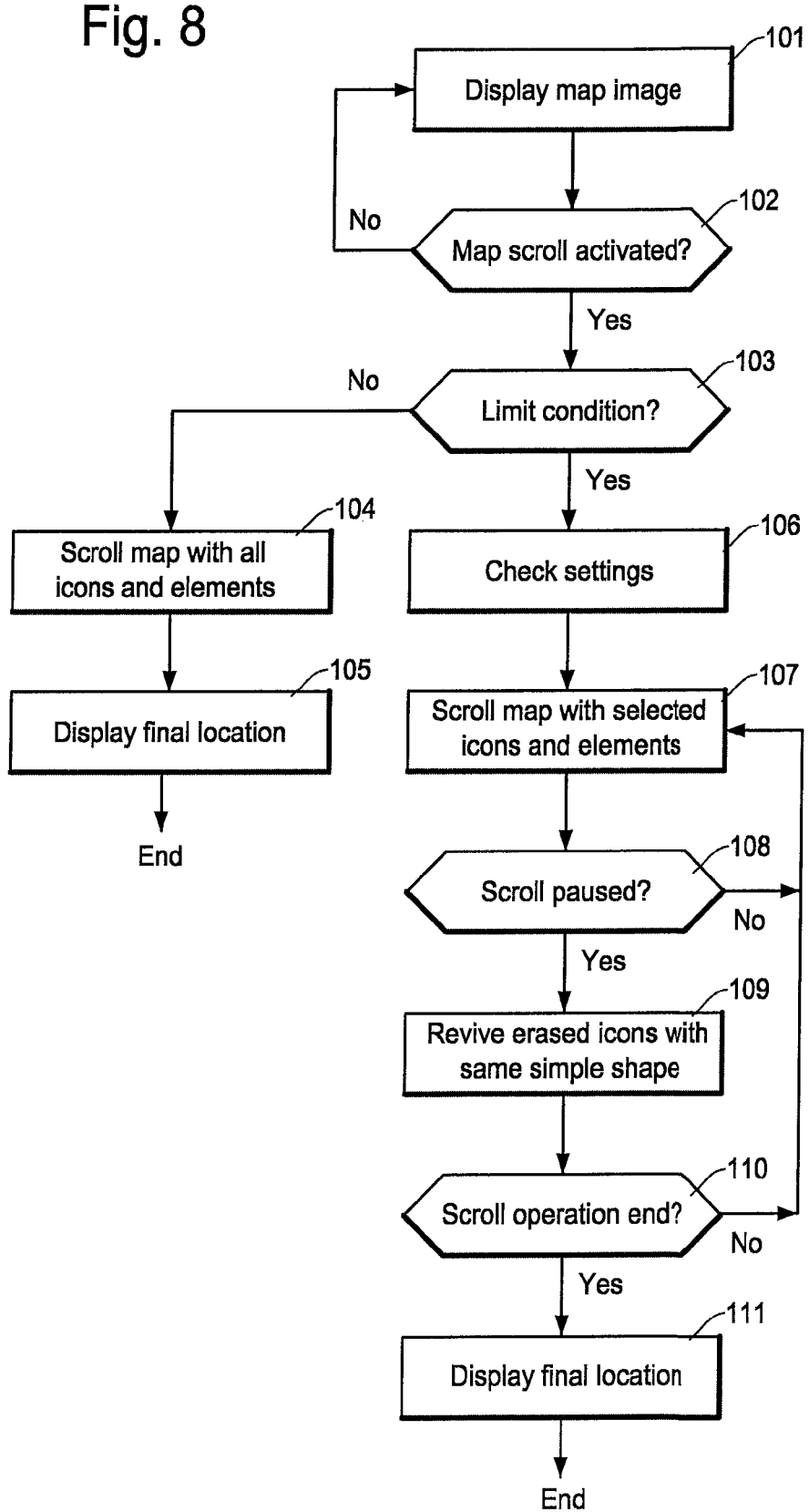
FIG. 8 is a flow chart showing an example of basic operational steps of the map scrolling method of the present invention for selectively displaying the icons and other elements on the map image based on conditions and settings of the navigation system or vehicle during the transition stage of the map scrolling operation.
Figure 9:
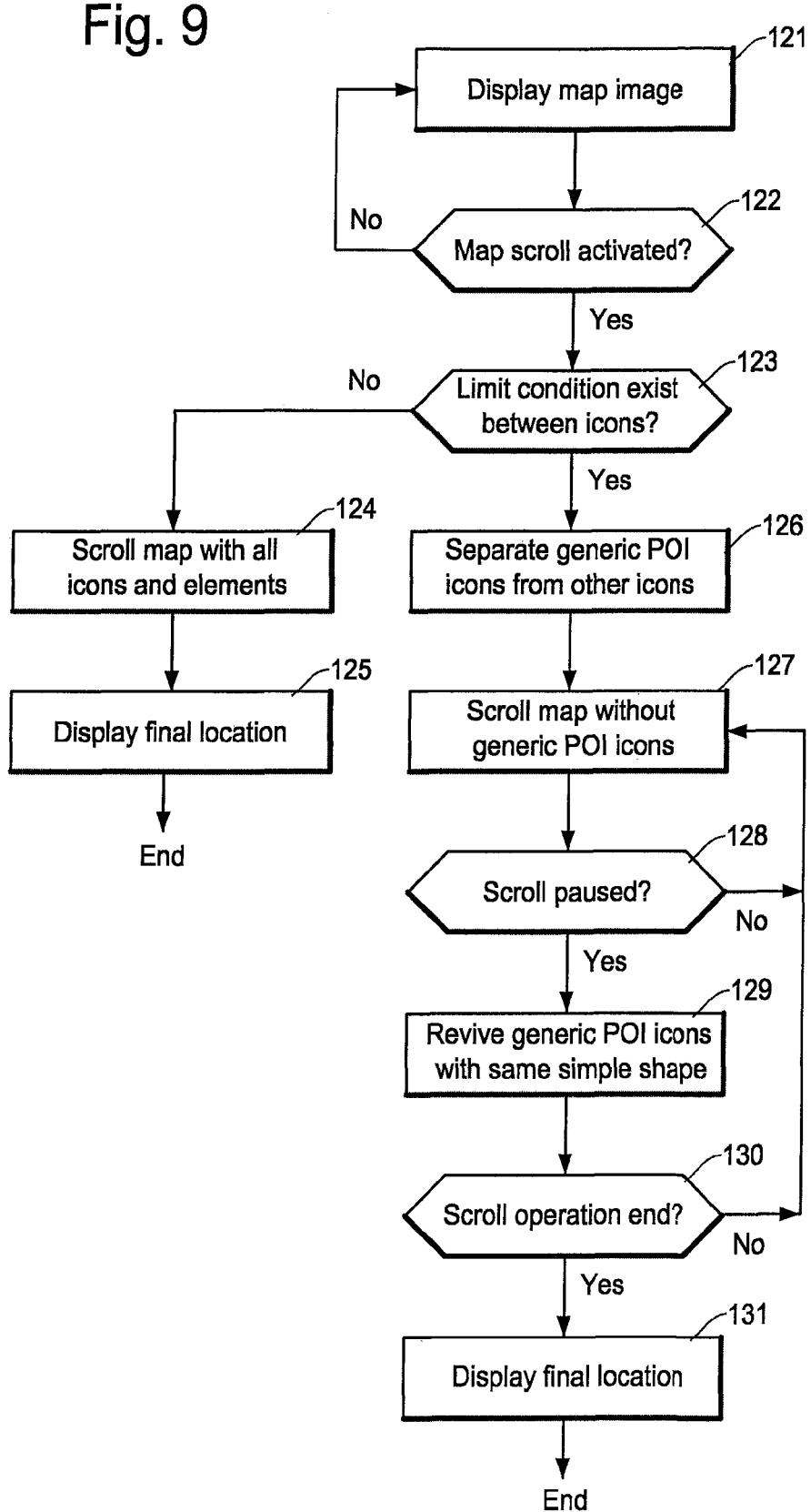
FIG. 9 is a flow chart showing an example of operational steps of the map scrolling method of the present invention where the generic POI icons are removed from the map image based on conditions and settings of the navigation system or vehicle during the transition stage of the map scrolling operation.

The flow chart of FIG. 9 is similar to that of FIG. 8 and shows the operational steps of the present invention in which the generic POI icons are removed during the transition period of the map scrolling operation. The number of generic POI icons is large, thus, during the transition stage of the map scrolling operation, generic POI icons which represent categories of POIs such as restaurant, gas stations, etc., are prohibited from being displayed. In contrast, other icons such as brand name icons and map elements are continuously displayed since these icons and map elements are usually more important than the generic POI icons to the user.

First, the navigation system will display the map image in the step 121 where such a map image can be that of FIG. 1B with numerous icons and map elements. The navigation system checks whether the map scrolling operation is started in the step 122 by monitoring whether the map scroll keys are activated. The navigation system repeats the steps 121 and 122 until the map scrolling operation is conducted by the user. If the map scrolling operation is activated, in the step 123, the navigation system determines whether any conditions or settings are provided in the navigation system for erasing the generic POI icons.

If there is no condition attached to the map scrolling operation, the process moves to the step 124 in which the navigation system scrolls the map image with all of the icons and map elements. Thus, none of the icons and the map elements are removed or erased from the map image during the transition period of the map scrolling operation. In the step 125, the navigation system displays the map image at the final location specified by the user with all of the icons and map elements.

If the navigation system detects that there are conditions attached to the map scrolling operation in the step 123 to remove the generic POI icons, the process moves to the step 126 in which the navigation system distinguishes the generic POI icons from other icons and map elements. Based on such distinction between the generic POI icons and the other icons and elements, in the step 127, the navigation system scrolls the map image toward the direction specified by the user while displaying only the selected icons and map elements.

In other words, the navigation system removes the generic POI icons from the map image during the transition stage of the map scrolling operation. Since the number of generic icons is large, the removal of the generic POI icons during the map scrolling operation significantly simplifies the image on the screen so that the user is able to see the important information. The simplified map image on the screen also contributes to improve the performance of the navigation system.

In the step 128, the navigation system determines whether the map scrolling operation is paused, i.e., temporarily stopped for a short period of time. If there is no pause, the navigation system repeats the steps 127 and 128 noted above. If the map scrolling operation is paused, in the step 129, the navigation system revives the generic POI icons that have been removed from the map image. As described with reference to FIG. 3C, such revived generic POI icons do not have the original images but rather have marks each being a simple and identical shape, which simplifies the operation of the navigation system.

In the step 130, the navigation system determines whether the map scrolling operation by the user is completed, i.e., stopped for a time longer than the predetermined time. If the map scrolling operation is not completed, the navigation system repeats the steps 127-130 noted above. If it is determined that the map scrolling operation is completed, the process moves to the step 131 in which the navigation system displays the map image at the final location specified by the user with all of the icons and map elements as shown in FIG. 3E.

FIG. 10 is a schematic diagram showing an example of data tables or database incorporated in the map scrolling method and apparatus of the present invention for storing various icons. In this example, a data table 141 stores a list of the generic POI icons which show categories of POIs such as gas station, restaurant, lodge, bank, etc., and traffic incident icons. A data table 142 stores a list of brand name icons with their graphic representation.

Figure 11:
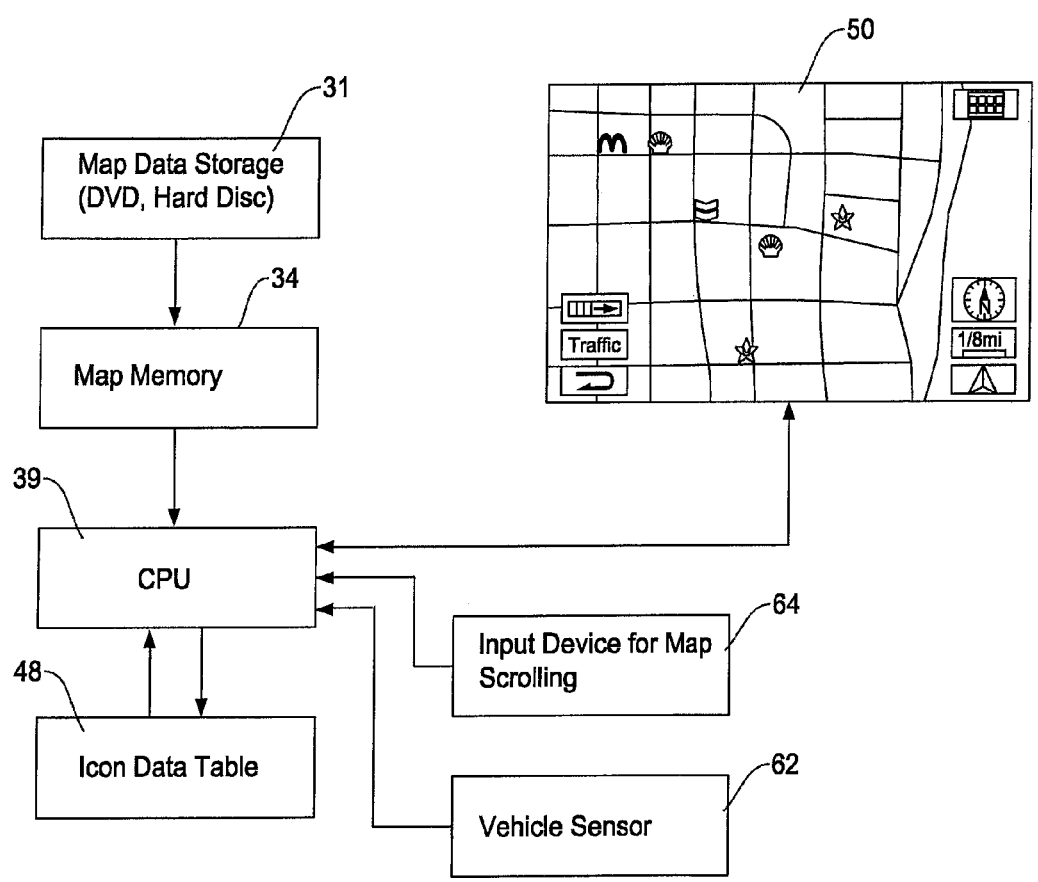
FIG. 11 is a block diagram showing an example of functional structure of the map scrolling apparatus under the present invention for selectively displaying the icons during the map scrolling operation.

FIG. 11 is a functional block diagram showing an example of basic structure of the map scrolling apparatus of the present invention for selectively displaying icons and map elements during the transition period of the map scrolling operation. The structure of FIG. 11 is applicable to any electronic device having a navigation function which enables the electronic device to guide the user to a particular location as noted above. The apparatus of the present invention includes a monitor 50 for interfacing with the user, and a map scroll controller (CPU) 39 for controlling an overall operation of the apparatus of the present invention.

The block diagram of FIG. 11 further includes a map data storage 31 such as a DVD or a hard disc for storing map data, a map memory 34 for storing a required portion of map data retrieved from the map data storage 31, an input device 64 for the map scroll operation such as a keypad or a remote controller, a vehicle sensor 62 for detecting conditions of the vehicle such as a remaining amount of fuel in the fuel tank of the vehicle, and an icon data table 48 for storing various types of icon data (FIG. 10) for processing and operation of the map scrolling apparatus.

In FIG. 11, the map scrolling apparatus of the present invention is able to retrieve the map data from the map data storage 31 and map memory 34. Based on the retrieved map data, the map scrolling apparatus displays the map image on the monitor 50 which may be scrolled by the user through the operation of the input device 64. If the electronic device implementing the present invention has a communication capability either through wire or wireless, such map data can be retrieved from a remote data server. The CPU 39 controls an overall operation of map scrolling by checking predefined conditions for erasing certain types of icons during the transition period of the map scrolling, and reviving the erased icons, etc.

For scrolling the map image, the user operates the input device 64 to change the map image from the current location to another location. As soon as the input device is activated, the CPU 39 checks whether there is any predefined condition for the map scrolling operation. Typically, as noted above, since the number of generic POI icons can be numerous, the predefined conditions are such that the images of the generic POI icons be deleted during the transition period of the map scrolling operation. Based on the conditions, the CPU 39 determines as to which icons and/or map elements should be erased and which icons and/or map elements should remain on the map image.

During the map scrolling operation, the CPU 39 determines whether the map scrolling operation is paused, i.e., temporarily stopped for a short period of time. If the map scrolling operation is paused, the CPU 39 revives the generic POI icons that have been removed from the map image. As described with reference to FIG. 3C, such revived generic POI icons do not have the original image but rather have a simple and identical shape, which simplifies the operation of the navigation system. The CPU 39 determines whether the map scrolling operation by the user is completed, i.e., stopped for a time longer than the predetermined time. If the map scrolling operation is completed, the CPU 39 controls the map scrolling apparatus to display the map image at the final location specified by the user including all of the icons and map elements.

Figure 12:
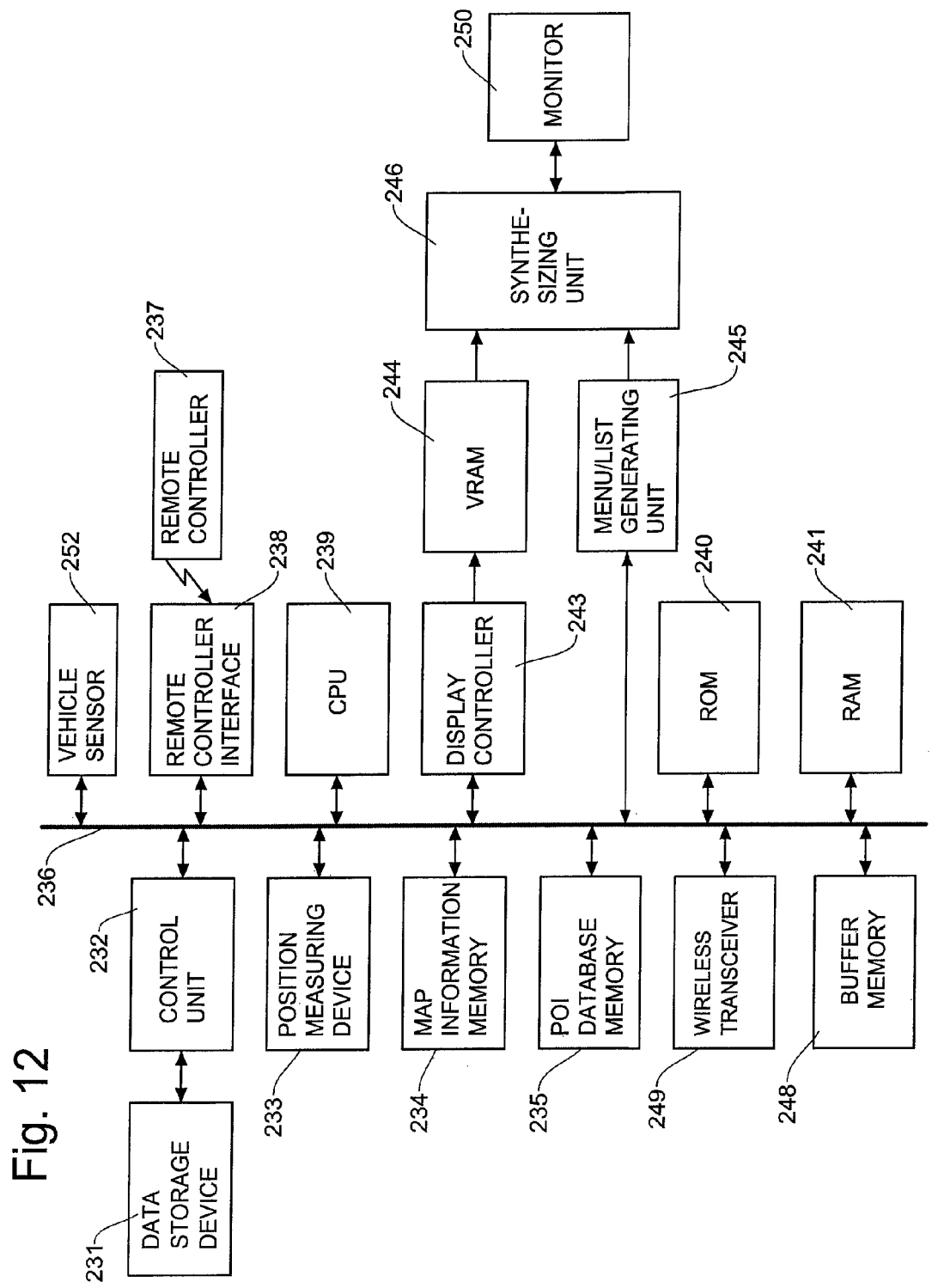
FIG. 12 is a functional block diagram showing an example of structure of a vehicle navigation system for implementing the map scrolling method and apparatus of the present invention.

FIG. 12 shows an example of structure of a vehicle navigation system for implementing the map scrolling method of the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 231 such as a hard disc, CD-ROM, DVD or other storage means for storing the map data. The POI icons and brand name icons involved in the present invention may also be stored in the data storage medium 231 or other memory (ex., memory 248). The navigation system includes a control unit 232 for controlling an operation for reading the information from the data storage medium 231, and a position measuring device 233 for measuring the present vehicle position or user position. For example, the position measuring device 233 has a vehicle speed sensor for detecting a moving distance, a gyroscope for detecting a moving direction, a microprocessor for calculating a position, a GPS (global positioning system) receiver for receiving GPS signals from satellites, and etc.

The block diagram of FIG. 12 further includes a map information memory 234 for storing the map information which is read from the data storage medium 231, a database memory 235 for storing database information such as point of interest (POI) information which is read out from the data storage medium 231, a remote controller 237 for executing a menu selection operation, an enlarge/reduce operation, a destination input operation, map scrolling operation, etc. and a remote controller interface 238. Although a remote controller is a typical example for selecting menus, executing selected functions and etc., the navigation system includes various other input methods to achieve the same and similar operations done through the remote controller.

In FIG. 12, the navigation system further includes a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a guide route, a display controller 243 for generating map image (a map guide image and an arrow guide image) on the basis of the map information, a VRAM 244 for storing images generated by the display controller 243, a menu/list generating unit 245 for generating menu image/various list images, a synthesizing unit 246, a wireless transceiver 249 for wireless communication to retrieve data such as traffic incident information from a remote server, a buffer memory 248 for storing data such as the data tables of FIG. 10 that include the generic POI icons and brand name icons, a monitor (display) 250, and a vehicle sensor 252.

The vehicle sensor 252 detects various conditions associated with the navigation system and vehicle such as weather, temperature, brake fluid, remaining gas in the gas tank, vehicle speed, distance from other object, etc. The information from the vehicle sensor 252 can be used to selectively limit and display icons suited for a particular condition. For example, as noted above with reference to FIG. 6, the vehicle sensor 252 detects the remaining amount of gasoline in the gas tank of the vehicle and sends a signal to the CPU 239, thereby prioritizing the gas station icons on the map image during the map scrolling operation. The CPU 239, similar to the CPU 39 of FIG. 11, controls the overall operation of the vehicle navigation system including the map scrolling operation of the present invention such as the ones described with reference to the flow charts of FIGS. 8 and 9.

As has been described above, according to the map scroll method and apparatus of the present invention, the navigation system selectively displays icons or other map elements when scrolling the map image. Namely, the navigation system prohibits, during the transition stage of the map scrolling operation, certain icons or map elements from being displayed while allowing the other icons or map elements to be displayed based on predetermined or changing conditions and settings of the navigation system or vehicle. Rather than displaying all of the icons and map elements, since the navigation system displays only the selected icons and map elements, the map image is simplified so that the user will not be distracted by unnecessary information or incorrect information on the map image. Further, the computation power of the navigation system is not impaired because the number of icons on the screen involved in the map scrolling operation is reduced, which improves the performance of the navigation system.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. An apparatus for scrolling map images for a navigation system, comprising:
　　a display configured to display thereon map images concerning operations of navigation system;
　　a position measuring device including a GPS receiver that detects a current position to be used for generating the map images on the display;
　　a storage unit configured to store data and programs for operations of navigation system;
　　an input device configured to accept a user's input for the navigation system; and
　　a central processing unit configured, by executing the programs in the storage unit, to conduct the following operations of:
　　　　detecting activation of a map scrolling operation of the navigation system by the user via the input device;
　　　　checking whether there is any limit condition attached to icons or map elements as to remove them from the map image on the display;
　　　　scrolling the map image on the display toward a specified direction while removing the icons or map elements to which the limit condition is attached from the map image during a transition period of the map scrolling operation;
　　　　detecting that the map scrolling operation is paused when a time length of each temporary stop of the map scrolling operation is shorter than a predefined pause time by checking the time length of each temporary stop of the map scrolling operation;
　　　　reviving, when the map scrolling operation is paused, the icons or map elements that have been removed from the map image by representing the revived icons and map elements with simplified marks of identical shape on the map image; and
　　　　causing to display all of the icons and map elements of original images at a location on the map image where the map scrolling operation is completed, wherein the map scrolling operation is completed when a time length of a stop of the map scrolling operation is longer than the predefined pause time.

2. An apparatus for scrolling map images as defined in claim 1, wherein the central processing unit is further configured to conduct an operation of displaying a list of place names of the icons that are located proximate to a specified location on the map image, either that have been removed or not during the transition period of the map scrolling operation.

3. An apparatus for scrolling map images as defined in claim 1, wherein each of said marks representing the revived icons and map elements that have been removed from the map image has a square shape and is displayed in a manner of either transparent or semi-transparent on the map image.

4. An apparatus for scrolling map images as defined in claim 1, wherein said limit condition is attached to generic POI icons where each generic POI icon represents a category of point of interest (POI), and wherein the central processing unit is further configured to conduct an operation of removing the generic POI icons from the map image while continuously displaying brand name icons on the map image during the transition period of the map scrolling operation where each brand name icon represents a particular product, company or a service provider.

5. An apparatus for scrolling map images as defined in claim 4, wherein the central processing unit is further configured to conduct an operation of continuously displaying the brand name icons of only within a selected category during the transition period of the map scrolling operation.

6. An apparatus for scrolling map images as defined in claim 1, wherein said limit condition is attached to generic POI icons where each generic POI icon represents a category of point of interest (POI) and brand name icons where each brand name icon represents a particular product, company or a service provider both of the icons are outside of a selected category, and wherein the central processing unit is further configured to conduct an operation of removing the generic POI icons and the brand name icons to which the limit condition is attached from the map image while continuously displaying the generic POI icons and the brand name icons within the selected category during the transition period of the map scrolling operation.

7. An apparatus for scrolling map images as defined in claim 1, wherein said limit condition is preset in the navigation system or constantly renewed based on current condition of the navigation system or a vehicle carrying the navigation system.

8. An apparatus for scrolling map images as defined in claim 7, wherein said limit condition is constantly renewed based on a signal from a vehicle sensor that shows current conditions of the vehicle or traffic incident information from a remote server that shows current traffic condition associated with user's travel.

\* \* \* \* \*